May 7, 1968  N. MALARKEY, JR  3,381,609
FILTER PRESS
Filed June 20, 1966  4 Sheets-Sheet 2

Neil Malarkey, Jr.
INVENTOR.

BY Ramsey, Kolisch & Hartwell
Attys.

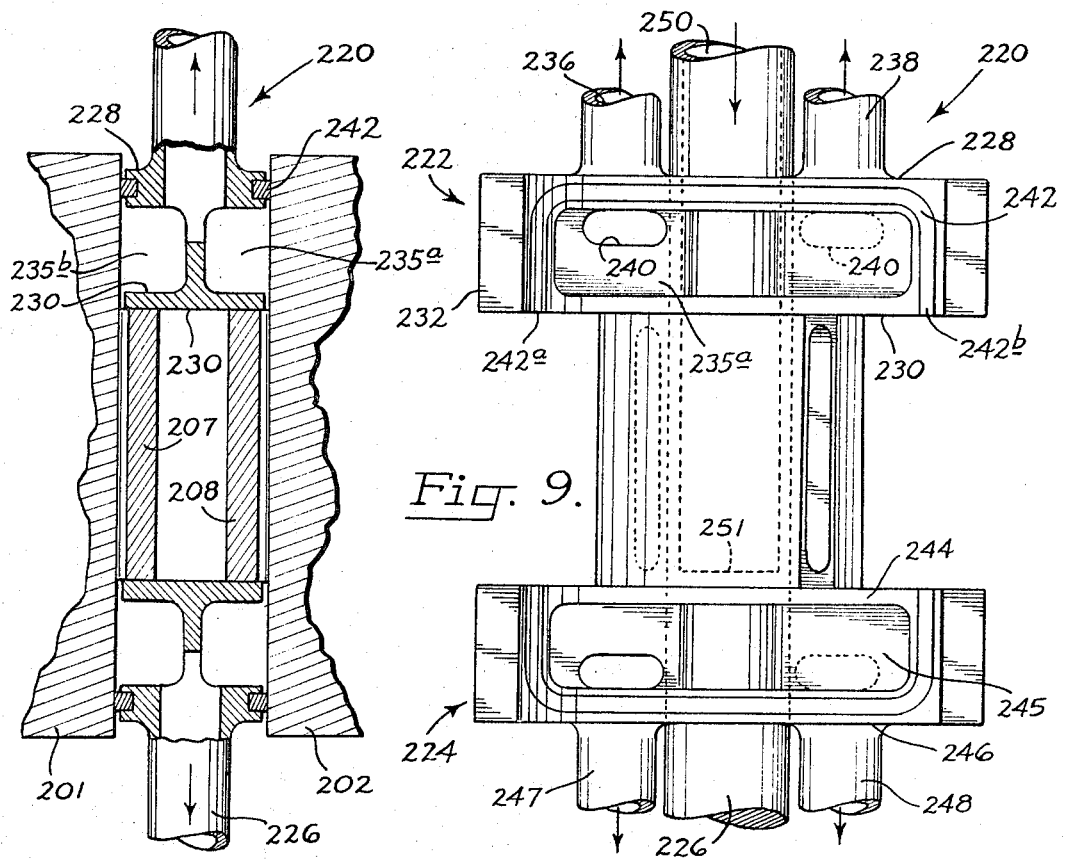
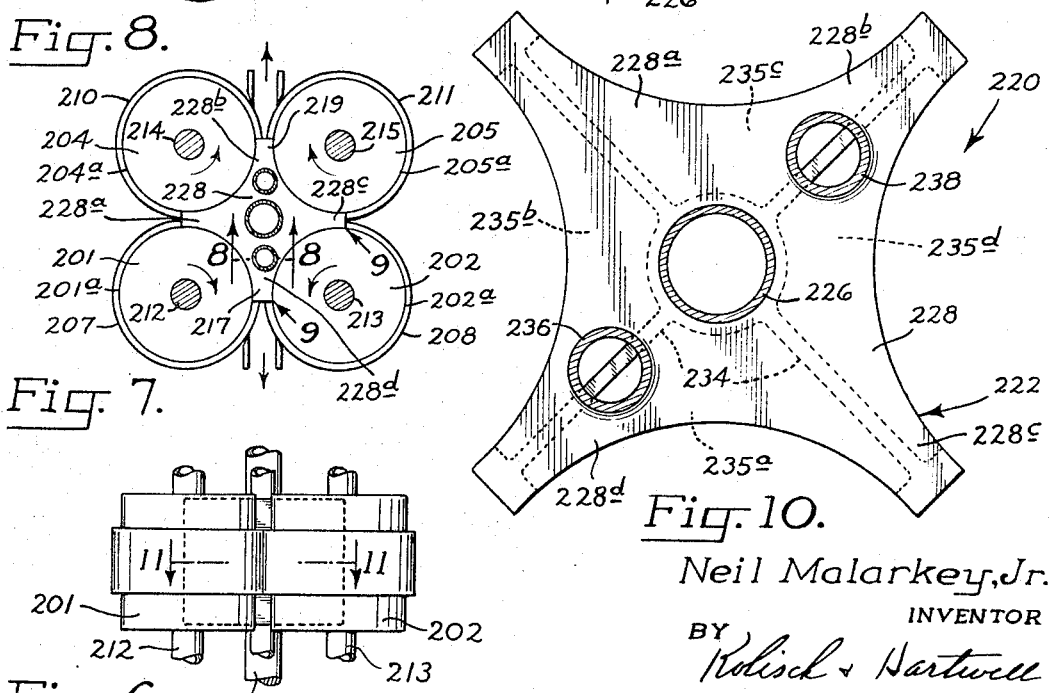

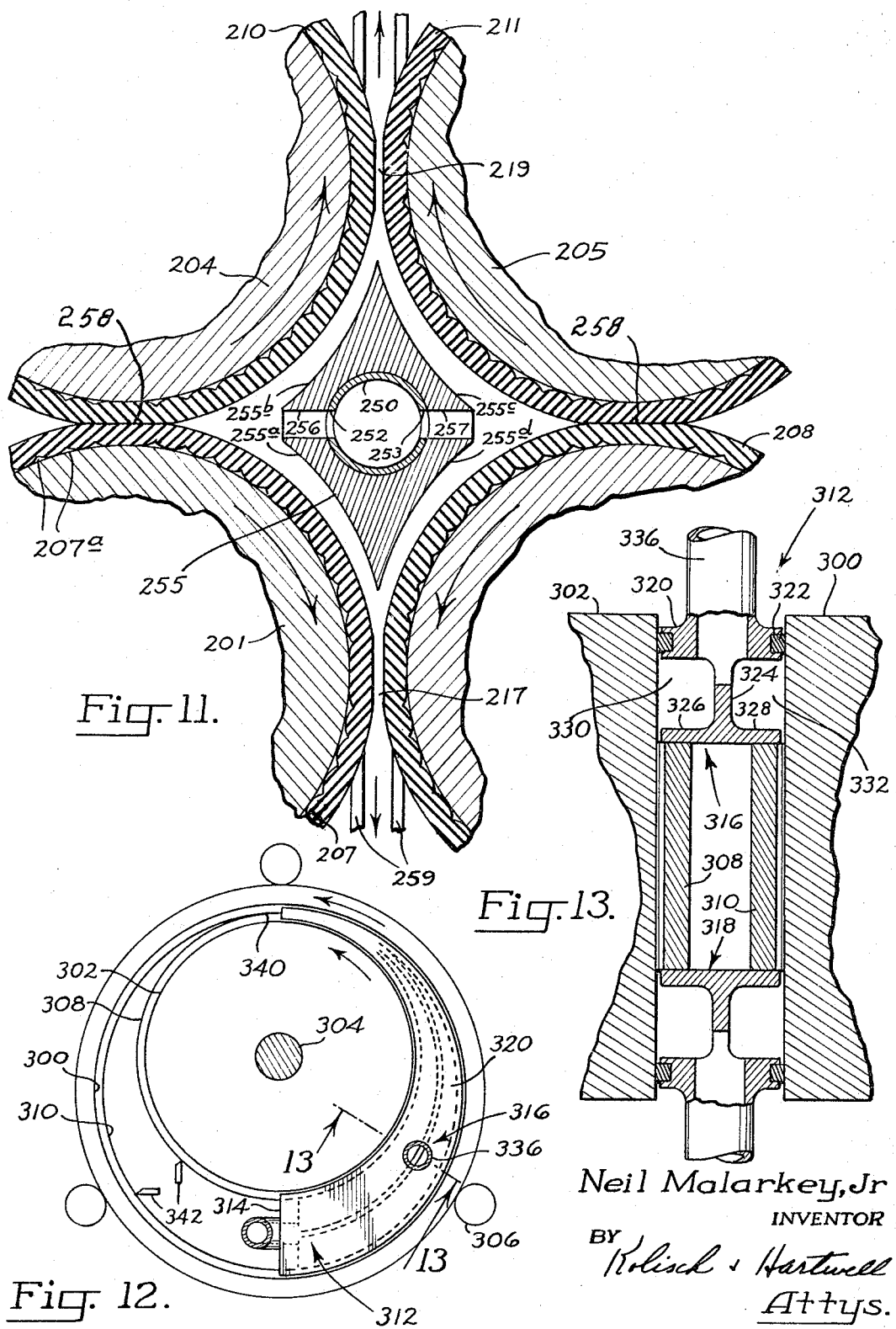

United States Patent Office 3,381,609
Patented May 7, 1968

3,381,609
FILTER PRESS
Neil Malarkey, Jr., Rte. 2, Box 2126,
Seattle, Wash. 98110
Continuation-in-part of application Ser. No. 388,770,
Aug. 11, 1964. This application June 20, 1966, Ser.
No. 563,007
11 Claims. (Cl. 100—118)

This application is a continuation in part of prior filed application entitled "Press for Extracting Liquids from Mixtures," filed August 11, 1964, having Serial No 388,770, now abandoned.

This invention concerns a press for extracting liquid from a liquid-solid mixture, or from a mixture of liquid and semi-solids. More particularly, the invention concerns a continuous press for performing such a separation.

The particular embodiment of the invention described herein comprises a juice press that may be employed, for instance, to process pomace to separate apple juice from pulp constituents. Features of the press, of course, may have utility in other fields, and while describing the press in connection with the extraction of juice, it is not thereby intended to be limited only to this use.

Continuous presses for extracting liquids from liquid mixtures are known. Many of such presses have been extremely complicated, which has limited their usefulness. Presses of a simplier nature have either been impractical as a means for handling any volume of material, or ineffective to produce proper filtration of a mixture whereby a clear filtrate is obtained. Some presses have withdrawn filtrate at multiple points located throughout the press, utilizing complicated channels or drains. This introduces a cleaning problem, which is particularly disadvantageous where food products are being handled, as periodic thorough cleaning is a necessity when handling such materials. In presses where relatively high pressures are developed, particularly where continuous operation is contemplated, pressure control has been difficult, and stresses have tended to develop locally in the press ultimately causing breakdown.

A general object of this invention is to provide an improved press which takes care of the above-mentioned difficulties in a highly practical and satisfactory manner.

Another object is to provide a continuous press, which has a continuous belt providing one of a pair of opposed sides in a processing chamber for the press, and features novel means along at least one margin of this belt for collecting filtrate extracted in the processing chamber.

More specifically, an object is to provide a press having means forming barriers along one set of sides of a processing chamber, where said chamber is defined along one (and preferably both) of another set of sides by moving belts, and the barriers constitute outer limits of filtrate zones in which filtrate collects prior to removal from the press.

Yet another object is to provide a press where opposed and imperforate converging walls define a processing chamber, and at least one and preferably a pair of opposed filter belts between these walls function to apply pressure to the material being filtered, with filtrate thus produced moving laterally of the filter belts into collection chambers or zones adjacent sides of the processing chamber.

A still further object is to provide a press where such filter belts are carried on imperforate walls mounted so that opposed expanses of the walls define a processing chamber of diminishing cross section progressing from the feed to the off-bearing end of the processing chamber. In one modification of the invention these walls may constitute opposed reaches of elongated imperforate conveyor belts, while in other modifications the walls may be the outer surfaces of cylinders.

According to the invention, elongated partitions are contemplated extending in the direction of convergence of the processing chamber, snugly adjacent margins of such filter belts, which in conjunction with the filter belts operate to prevent lateral flow of solid material from between the filter belts. Filtrate flow only is accommodated and such flows laterally into filtrate zones disposed on opposite sides of the filter belts.

The partitions and barriers forming filtrate zones for the collection of filtrate, may be part of elongated fingers, which themselves may be part of what is termed herein a collector in the press. The press is easily cleaned by removing the collector, and in a preferred embodiment of the invention such removal entirely exposes the processing chamber and the zone where pressure is applied to a mixture prior to the extraction of liquid therefrom. The collector itself is easily cleaned, being relatively devoid of small orifices and hard-to-clean drain passages. Fluid flow, by reason of the imperforate belts that back the filter belts, is confined to an area between the imperforate belts and the back sides of the latter belts do not become dirtied. Pressures are developed evenly, through pressure platens which back the imperforate conveyor belts described.

These and other objects and advantages are attained by the invention, and the same is described hereinbelow in conjunction with the accompanying drawings, wherein:

FIG. 5 is a cross-sectional view taken along the line 5—5 in FIG. 2, on a still larger scale;

FIG. 6 is a side elevation somewhat simplified and on a reduced scale of another modification of the invention;

FIG. 7 is a top plan view of the apparatus shown in FIG. 6;

FIG. 8 is a view on a somewhat enlarged scale taken along the lines 8—8 in FIG. 7;

FIG. 9 is a side view of a collector in the apparatus, on the same scale as FIG. 8, showing the collector as it would appear viewing it from the line 9—9 in FIG. 7 with such removed from the apparatus;

FIG. 10 is a top view of the collector as shown in FIG. 9;

FIG. 11 is a cross-sectional view, also on a somewhat enlarged scale, taken along the line 11—11 in FIG. 6;

FIG. 12 illustrates still another modification of the invention; and

FIG. 13 is a cross-sectional view, on a slightly enlarged scale, taken generally along the line 13—13 in FIG. 12.

Figure 1:
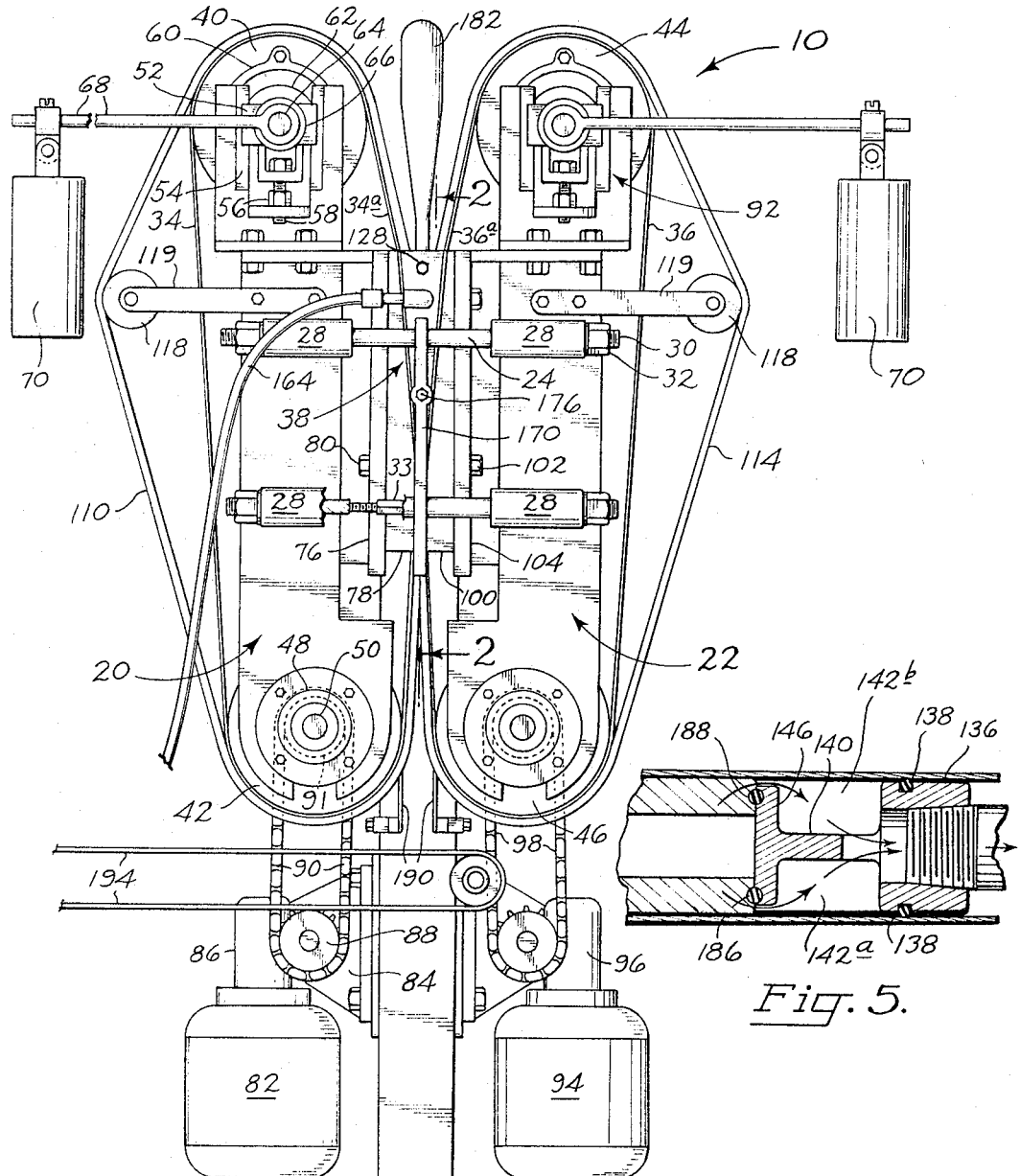
FIG. 1 is a side elevation of a continuous press according to an embodiment of this invention, showing a supporting frame for the press and mounted on this frame a pair of continuous imperforate belts, having filter belts extending about the outside thereof.

Referring now to the drawings, and first of all more particularly to FIGS. 1 through 5 showing one modification of the invention, a press as contemplated herein is indicated generally at 10 (see FIG. 1). The press includes a main supporting frame 12, comprising a standard 14 and horizontals 16 secured to the standard which rest on the floor.

Frame 12 supports above the floor a pair of elongated, opposed, and substantially upright frame sections, designated at 20, 22. As exemplified by the sides of the two frame sections which face the viewer in FIG. 1, these may be interconnected on each side of the press by a pair of strain rods 24. The strain rods extends between the frame sections, and are received within sleeves 28 joined as by welding to the sides of the frame sections. The ends of the strain rods may be threaded as at 30, and nuts 32 screwed onto these threaded ends function to hold the frame sections from spreading apart on the strain rods. Spacers such as spacer 33 interposed between the frame sections hold the frame sections a predetermined distance apart. Suitable bracket structure (not shown) extending between standard 14 and the strain rods on the side of the press away from the viewer in FIG. 1 holds the frame sections in the elevated position illustrated in FIG. 1.

In the press of the invention, opposed vertical reaches 34a, 36a of continuous imperforate conveyor belts or bands 34, 36 are utilized to define opposite sides of what is referred to herein as a processing chamber for the press, such being at the general location indicated at 38 in FIG. 1. Band 34, which is shown to the left in FIG. 1, travels over a drum or roll 40 journaled adjacent the top of frame section 20, and a drum or roll 42 journaled adjacent the bottom of this frame section. Similarly, band 36 at the right of the press travels around drums or rolls 44, 46 journaled adjacent the top and bottom of frame section 22.

The mountings for drums 40, 42 training band 34 may be similar to the mountings for the drums training band 36. Specifically, and considering the drums for band 34, on each side of the press adjacent the bottom of frame section 20 is a bearing such as bearing 48 fastened to the frame section. These bearings journal a shaft 50 fastened to and extending through the center of drum 42. Adjacent the top of frame section 20 on each side of the press is a vertically adjustable bearing block 52, mounted for vertical travel on guides 54, and placed in different adjusted positions by means of a nut 56 and threaded stud 58. Drum 40 is journaled adjacent each of its ends on a bearing such as bearing 60, and the inner races of these bearings are mounted on a sleeve 62 which in turn is mounted on a shaft 64. The axis of sleeve 62 is offset somewhat from the axis of shaft 64, i.e., the sleeve and shaft are eccentric. The ends of shaft 64 are journaled in bearing 66 mounted in bearing blocks 52.

With the eccentric mounting described for upper drum 40, on turning shaft 64 the drum may be shifted toward or away from the lower drum. Each end of shaft 64 on either side of the press has secured thereto an arm 68 from which depends a weight 70. These weights exert a torque on shaft 64, whereby the same is urged to rotate in a direction causing drum 40 to move away from lower drum 42. The weights and the eccentric mechanism described constitute belt tensioning means operable to maintain proper tension in band 34.

Integral with frame section 20 and facing frame section 22 is a substantially vertical flat faced web 76, which provides a mounting for a pressure platen 78. Platen 78 is shown attached to web 76 by fasteners 80. A low coefficient of friction surfacing material may be provided over the side of the platen which faces the inside of band 34 (shown in FIG. 4 at 81), whereby the band on moving over the platen slides easily across the front thereof. For example, Teflon sheets may be suitably mounted over the front face of the platen to provide such a low coefficient of friction surface. A continuous press utilizing such Teflon sheets is more fully described in U.S. Patent 3,215,065, entitled "Continuously Operating Press Apparatus."

Band 34 is moved so that its reach 34a moves downwardly in FIG. 1, i.e., in a clockwise direction, by a motor 82 supported on standard 14 by bracket 84. Drive is transmitted from the motor to drum 42 through a gear reduction unit 86, a sprocket 88, a chain 90, and a sprocket 91.

In all material respects the mounting of band 36 on the right hand frame section 22 is like the mounting described for band 34 on frame section 20. Thus, adjacent the top of the frame section is eccentric mechanism 92 similar to that described in connection with drum 40 for effecting tensioning in band 34. The band is moved so that reach 36a moves downwardly, or in a counterclockwise direction, by a motor 94, gear reduction unit 96, and chain 98. Backing reach 36a of band 36 between rolls or drums 44, 46 is a platen 100 which is fastened by fasteners 102 to vertical flat faced web 104 integral with frame section 22.

The opposing faces of platens 78, 100 converge on each other progressing downwardly in FIG. 1, and this convergence is imparted to reaches 34a, 36a of the bands where they extend over the platens. These reaches of the bands, therefore, at the location of processing chamber 38, constitute elongated, opposed, imperforate converging walls forming one set of sides of the processing chamber.

Figures 2, 3, 4:
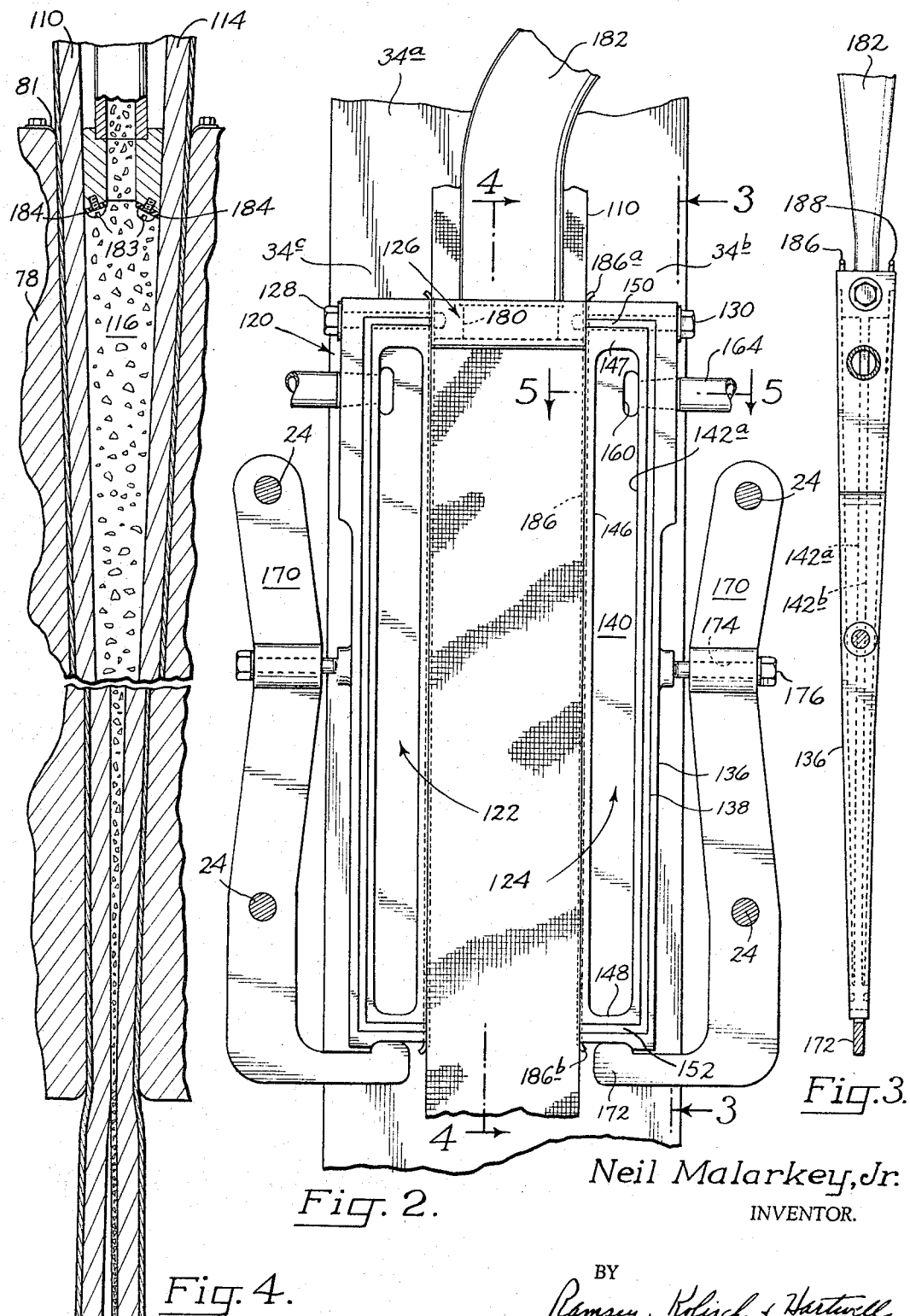
FIG. 2 is a view, drawn on a somewhat enlarged scale, and taken generally along the line 2—2 in FIG. 1, illustrating details of a processing chamber in the press and what is termed a collector, which partially defines this processing chamber.
FIG. 3 is a cross-sectional view taken along the line 3—3 in FIG. 2.
FIG. 4 is a cross-sectional view taken along the line 4—4 in FIG. 2, on an even larger scale.

Referring now to FIGS. 1 and 2, band 34 has extending around the outside thereof, and directly adjacent the band where it forms one side of the processing chamber, a continuous filter belt 110. The filter belt may have a fabric composition (a layered nylon cloth belt has been satisfactory), and is porous and somewhat compressible. The belt is somewhat narrower than band 34, and in a transverse direction is disposed centrally of the band so that margins 34b, 34c (see FIG. 2) of the band are left exposed on either side of the filter belt. Band 36 has a similar filter belt 114 extending around its outside. In the processing chamber, as best seen in FIGS. 2 and 4, these filter belts travel downwardly in positions disposed opposite each other with platens 78, 100 compressing the belts together adjacent the base of the chamber. The filter belts, where they travel downwardly between the platens, define opposite sides of an elongated zone 116 for holding material to be filtered (pomace in a press for extracting apple juice).

Filter belts 110, 114 outwardly of frame sections 20, 22 extend over rolls 118 which are journaled on adjustable brackets 119 secured to the frame sections. The rolls and adjustable brackets provide a means for producing proper tension in the filter belts.

Considering now FIGS. 2, 3, 4, and 5, mounted between the opposed vertical reaches of bands 34, 36 is what is referred to herein as a collector 120, including elongated, opposed finger portions 122, 124 and a transverse cross piece 126 interconnecting these finger portions. In the embodiment of the invention illustrated, cross piece 126 is shown fastened to the finger portions through fasteners 128, 130 extending in from the sides of the finger portions and into the ends of the cross piece. With the collector assembled in the press, inner edges of the finger portions lie snugly adjacent the side edges of the filter belts, and between the faces of bands 34, 36, where these faces are exposed along side margins of the bands, as at 34a, 34b for band 34.

Each finger portion comprises an elongated outer web 136 of approximately trapezoidal outline. The web occupies a plane approximately normal to the planes of bands 43, 36 where these bands define the processing chamber. Along nonparallel edges of web 136 are mounted elongated sealing strips 138. With the collector mounted in the press, the opposed sealing strips carried by the web form a seal with the exposed margins of the bands backing the filter belts. In each finger portion, the web and its sealing strips function as a flow barrier inhibiting liquid flow laterally outwardly beyond the location of the web.

Each finger portion also has a flange 140 inwardly of web 136, which is substantially normal to web 136, and which thus has opposite faces substantially paralleling bands 34, 36 where the bands define sides of the processing chamber. Flange 140 over each of its opposite faces is bonded by ridges 146, 147, 148, and these ridges together with web 136 define a recess or pocket on each side of a finger portion, such recesses being indicated at 142a, 142b.

The recesses in each finger portion are provided for the purpose of collecting filtrate as the same is extracted from the material being filtered prior to removal of the filtrate from the press. The recesses in effect form two chambers on each side of the finger portion into which such filtrate may flow. Each finger portion is apertured as at 160, and in this way the recesses on opposite sides of a finger portion communicate with each other. Connecting with each communicating set of recesses is a conduit 164 which forms a means for withdrawing filtrate from the press.

Sealing strip 138 may have transverse extensions integral therewith such as those shown at 150 and 152, which function to seal top and bottom regions of a finger portion to the exposed margins of the imperforate bands passing beside the finger portion.

Collector 120 is supported in the press between reaches 34a, 36a, of bands 34, 36 by brackets such as bracket 170 provided on each side of the press. Each bracket 170 is mounted on a set of strain rods 24 extending between the frame sections, and includes an end 172 which extends between the imperforate bands and supports the base of an adjacent finger portion. Above end 172, each bracket has a bore 174, through which extends a fastener 176. The fastener connects each bracket with a region of each finger portion intermediate its ends.

Cross piece 126 contains a passage 180 extending downwardly therethrough in FIG. 2. A conduit or duct 182, with one end projecting into the top of passage 180, feeds material to be filtered into zone 116 within the processing chamber in the press. Along the base of the cross piece, and fastened thereto by screws 183 are flexible strips 184 (which may be of nylon or other material) having edges that slide over the faces of the filter belts as they travel into the processing chamber. Strips 184 function to seal the cross piece to the filter belts and prevent leakage of unprocessed material upwardly and around the cross piece.

Extending along the inner edge of each finger portion, along ridges 146 on opposite sides of the finger portion, are a pair of elongated baffle elements 186, 188. These may be made of metal and are fastened in a suitable manner to the finger portion. The top and bottom ends of the baffle elements are bent outwardly slightly as shown by portions 186a, 186b in FIG. 2. The edges of the filter belts ride on sides of the baffle elements on traveling through the processing chamber, with the baffle elements tending slightly to compress the belts in a transverse direction. The outwardly bent portions adjacent the top of the processing chamber funnel reaches of the belts into the position they should have on passing through the processing chamber.

Referring now to FIG. 5, ridges 146 on opposite sides of a finger portion, and baffle elements 186, 188 mounted thereadjacent, constitute an elongated, nontraveling ledge or partition in the press extending longitudinally of the processing chamber adjacent each side thereof. This ledge on the inner side bears against the filter belts, and prevents flow of material other than filtrate laterally of the belts and into recesses 142a, 142b. Lateral travel of filtrate from the space between the filter belts is permitted, however, and in FIG. 5 the direction of filtrate flow is indicated by the arrows as through the filter belts and thence about opposite faces of the ridges (which are spaced somewhat from the faces of the imperforate bands) into recesses 142a, 142b. Thus the ridges and baffle elements, i.e., the ledge means, function as another set of sides of zone 116 extending longitudinally of the processing chamber for receiving material to be filtered. This zone is separated from recesses 142a, 142b in each finger portion, i.e., the zones for collecting filtrate, by a filtering agency in the form of the filter belts.

Adjacent drums 42, 46, a pair of scraper blades 190 are shown mounted on frame 12, which contact the filter belts where they extend about the drums and scrape solid material from the filter belts. Material dislodged by these scraper blades may fall onto a conveyor 194, to be carried away from under the belts.

In operating the press, the material to be filtered is pumped under pressure through duct or conduit 182 into zone 116, i.e., the space between the filter belts, and such material enters the zone adjacent the top of the press where the filter belts are spaced a substantial distance apart. As the filter belts travel downwardly through the processing chamber, they carry material with them, while being forced progressively closer together by the platens that back up the imperforate bands. Such tends to squeeze out filtrate which flows into recesses 142a, 142b and thence is withdrawn through conduits 164. Solid material that cannot pass through the filter belts remains between the faces of the filter belts, and where the filter belts pass over the bottom ends of the platens this material is compacted so tightly that substantially all filtrate has been removed. This residue is then carried forwardly by continued travel of the filter belts, whence it is scraped off from the belts by the scrapers described.

Referring now to FIGS. 6 through 11 wherein another modification of this invention is illustrated, the apparatus may be constructed with opposed drums or cylinders, such as those illustrated at 201, 202 and 204, 205, having outer cylindrical surfaces 201a, 202a, 204a, 205a, which constitute the converging walls defining the processing chamber. Filter belts, such as those shown at 207, 208 and 210, 211, extending about the surfaces of the drums and form the filtering agencies in the press.

Considering now specifics of such a press, in FIGS. 6 through 11 the press is illustrated with the framework supporting the operating parts, drive mechanism, and such structure omitted, in order best to illustrate the operating principle of the press. Drums 201, 202 and 204, 205 are mounted on upright shafts 212, 213, 214, and 215, which are journaled in suitable bearings in the press (not shown) and which are drivingly connected to suitable drive means (also not shown) whereby the drums are rotated with drums 201, 205 rotating in a clockwise direction and drums 202, 204 rotating in a counterclockwise direction. A bite or nip 217 is defined by drums 201, 202 with the outer surfaces of these drums converging progressing in a direction extending toward such bite, and similarly a bite 219 is defined between drums 204, 205 with the outer surfaces 204a, 205a of these drums converging progressing toward this bite or nip.

Mounted within the space generally encompassed by the various drums is a collector 220 corresponding to collector 120 discussed in connection with the first-described modification of the invention. The collector is utilized to collect filtrate produced by the press and also functions to supply material to be filtered into the press.

The collector comprises top and bottom closure assemblies 222, 224 which function as do the finger portions of the first-described modification. The two closure assemblies are similar, and thus only one will be described in detail. The assemblies themselves are mounted on a support shaft 226, which is suitably mounted in a stationary position on the framework of the press.

Considering now the construction of a closure assembly, and with reference to assembly 222, the assembly comprises an outer web 228 having, when viewed in plan as shown in FIG. 10, four projections, depicted at 228a, 228b, 228c, and 228d. These radiate out from shaft 226 which extends down through the outer web and is affixed thereto. The edges of these projections are curved to conform to the curving outer surfaces of the drums. Below web 228 in FIG. 9, and spaced axially downwardly on shaft 226, is an inner web 230. This web has substantially the same outline in plan as outer web 228, and thus includes projections which complement the projections illustrated for the outer web. Joining the extremities of complementing projections are plate portions, such as those shown at 232.

Between the two webs, and radiating from shaft 226, are divider walls 234. These divide the space between the outer and inner webs into four recesses or pockets, 235a, 235b, 235c, 235d, each of which is open where it faces the outer surface of a drum. These pockets correspond to recesses 142a, 142b discussed in connection with the first-described modification, and are for the collection of filtrate. Communicating with these pockets are conduits 236, 238. Also shown connecting adjacent pockets in a region between the webs are apertures, such as those illustrated at 240.

Top closure assembly 222 is sealed to the outer surfaces of the various drum by means of sealing strips, such as the one shown at 242. One is provided each edge of the outer web which extends adjacent a portion of the curving outer surface of a drum. As best illustrated in FIG. 9, each sealing strip has end portions 242a, 242b which extend down along the margins of plate portions 232 joining the ends of complementing projections of the outer and inner webs.

Bottom closure assembly 234 has inner and outer webs 244, 246 defining similar pockets, such as the one shown at 245. Communicating with these pockets and providing a path for the removal of filtrate therefrom, are conduits 247, 248.

Material to be filtered is fed into the press, into the region between the top and bottom closure assemblies. Thus, a passage is provided in shaft 226, shown at 250, extending to a bottom, shown at 251. Formed in the sides of the shaft (see FIG. 11) and communicating with this passage are opposed slots, such as those indicated at 252, 253. If desired, the space between the closure assemblies which is bounded by the drums and about the outside of shaft 226 may be partially taken up with a guide member 255 secured to the shaft, having an approximately diamond-shaped cross-sectional outline, as shown in FIG. 11, such member being slotted at 256, 257 with slots that communicate with slots 252, 253. In this way material is permitted to flow from passage 252 to the outside of the guide member. The guide member has outer curved surfaces, shown at 255a, 255b, 255c and 255d, which are adjacent the drum surfaces and which curve approximately as do the drum surfaces while converging on them.

Filter belts 207, 208, 210, 211, which extend about the drums pass between the top and bottom closure assemblies with their opposite margins riding snugly against the inner webs of the closure assemblies. The filter belts may have the construction described in connection with belt 110, whereby the belts are of a fabric composition and are porous and somewhat compressible. Preferably each belt along the inner face thereof, when in a relaxed state, has a corrugated appearance with shallow grooves, such as those shown at 207a in FIG. 11, extending transversely across the inner face of the belt. These grooves facilitate filtrate flow across the back face of a belt laterally to its sides and into the pockets described.

During operation of the press, and referring to FIG. 11, drums 201, 204 are rotated with their outer surfaces moving away from each other in that region of the press which is located between the top and bottom closure assemblies. Drums 202, 205 have a similar relationship in this regard. It is preferable that the radial spacing of the drums of such a pair of drums be such that the filter belts on the drums be compressed tightly where the drums come together, as at region 258, shown in FIG. 11. This compression of the belts has the effect of minimizing leakage flow outwardly from between the drums in this region. Considering drums 201, 202, the surfaces of these drums on rotation of the drums move away from each outwardly of the press from nip 217, and it is between such a pair of drums that discharge takes place of solid material remaining after the filtering process. A similar pair of such drums comprises drums 204, 205. The radial spacing between two drums of such a pair of drums is somewhat greater, so as to permit solid residue obtained by the filtering process to pass between the nip of the drums.

Located adjacent the outside of the press are scrapers such as those shown at 259 provided for the purpose of scraping solid residue from off the belts.

Describing now the operation of the press, shown in FIGS. 6–11, the inner webs of the closure assemblies function, as do flanges 146 earlier described, in forming elongated partitions within the processing chamber, which are located between the top and bottom webs of the closure assemblies and inhibit the passage of solid material laterally outwardly from the side margins of the filter belts. The outer webs comprise flow barriers forming the outer limits of the processing chamber, and as flow barriers operate to contain filtrate, whereby it is prevented from flowing outside of the region bounded by the closure assemblies. Material to be filtered is admitted through passage 250 in shaft 226, and with the drums rotated in the directions described, material tends constantly to be conveyed while being compresesd toward nips or bites 217, 219. As the material is compressed, filtrate is forced through the filter belts and thence flows laterally of the belts into the various pockets, whence the filtrate is collected in a suitable collecting vessel on passing out through conduits 247, 248. Solid residue with filtrate expressed therefrom passes through bits 217, 219, thence to be scraped off the filter belts by the scrapers described.

A still further modification of the invention is illustrated in FIGS. 12 and 13. In this modification of the invention, the opposed imperforate converging walls which form one set of sides of the processing chamber in the press are provided by the inner circumferential surface of a hollow cylinder, shown at 300, and the outer circumferential surface of a smaller cylinder 302. These drums or cylinders may be rotated under power, as by suitable drive means drivingly connected to shaft 304 joined to drum 302, and power driven rollers 306 which engage the outer circumference of hollow drum 300. The filter belts which comprise the filtering agency in this modification of the invention are shown at 308, 310. Belt 308 extends about the outside of the smaller drum 302, whereas belt 310 extends about the inner circumference of the larger drum 300.

In this modification of the invention, as in the first modification described, a collector is provided, designated at 312, which extends between the opposed converging surfaces of the two drums. The collector includes a cross piece 314 corresponding to cross piece 126 of the first-described modification, and opposed finger portions 316, 318 corresponding to finger portions 122, 124 of the first-described modification.

Each finger portion comprises an elongated outer web 320 approximately normal to the axes of the cylinders, and along the edges of web 320 are sealing strips 322. The web and its sealing strips function as a flow barrier inhibiting liquid flow laterally outwardly beyond the location of the web. Joined to each web is a flange 324 which is perpendicular to the plane of the web, and ridges 326, 328. These ridges together with the web define recesses in each finger portion, shown at 330, 332, for the collection of filtrate. A conduit 336 for each finger portion communicates with recesses and provides a path for the withdrawal of filtrate.

Cross piece 314 of this modification of the invention may have a construction similar to the cross piece discussed in connection with the first-described modification. The nip of the drums, where maximum compression of material to be filtered occurs, is indicated at 340. Progressing from this nip in the direction of rotation of the drums, the belts diverge from each other, and solid residue is removed from the surfaces of the filter belts through scrapers shown at 342.

The operation of this described modification of the invention is quite similar to the operation of the first-described modification. The construction has certain specific advantages, in permitting the elimination of multiple rollers for mounting the bands, and the elimination of rigid pressure platens for imparting through the bands compression to the material being treated.

The press of the invention is characterized by a number of important advantages. It will be noted that in the press, by reason of the imperforate walls that carry the filter belts, there is no movement of filtrate through and to the back sides of the walls. Collection of filtrate is by means enabling lateral flow of such material into expansive filtrate zones adjacent the sides of the press. These are defined by flow barriers sealed to the exposed walls. The press is devoid of complicated passages or ducts provided for the flow of filtrate which could present cleaning problems. When cleaning is necessary, it is a relatively easy matter to wash the collector described.

While there has been described an embodiment of the invention, it is obvious that changes and variations are possible to produce other modifications thereof. It is desired to cover all embodiments of the invention as would be apparent to one skilled in the art, and that come within the scope of the appended claims.

It is claimed and desired to secure by Letters Patent:

1. A press for extracting liquid from a liquid-solid mixture comprising opposed converging walls forming one set of sides of a processing chamber of diminishing side-to-side dimension progressing in the direction of the convergence of the walls, which walls are impervious to liquid flow therethrough, at least one of said walls being movable and operating to transport material to be filtered through said processing chamber; opposed elongated flow barriers in fluid-tight relationship with said converging walls, extending in the direction of the convergence of said walls, and forming another set of sides of the processing chamber; means extending in the direction of the convergence of said walls dividing the chamber into a filtrate zone for holding filtrate, which zone is bounded on one side by a flow barrier, and a zone for holding material to be filtered spaced laterally from this filtrate zone; and means connected to the filtrate zone for drawing off filtrate therein.

2. The press of claim 1, wherein said walls are cylindrical surfaces of drums mounted in relation to each other so that the surfaces converge to define a nip for the drums.

3. The press of claim 2, wherein the means dividing the chamber into zones includes a filtering agency extending along at least one drum surface.

4. A continuous press for extracting liquid from a liquid-solid mixture comprising a pair of opposed converging walls forming one set of sides of a processing chamber of diminishing side-to-side dimension progressing in the direction of the convergence of said walls, at least one of the walls being movable and operating to transport material to be filtered through the processing chamber; a continuous filter belt extending along at least one of said walls and movable with said one wall through said processing chamber, said filter belt within the chamber defining an elongated zone extending through the chamber for holding material to be filtered; opposed elongated flow barriers in fluid-tight relationship with said converging walls, extending in the direction of the convergence of said walls, and forming another set of sides of the processing chamber, at least one of said flow barriers being spaced laterally from the margins of said filter belt and defining an elongated filtrate zone disposed within said chamber located beside said first-mentioned zone for holding filtrate; and means connecting with said filtrate zone for removing filtrate therein.

5. A continuous press for extracting liquid from a liquid-solid mixture comprising a conveyor belt having an elongated reach forming one side of a processing chamber,
   an elongated wall opposite and spaced from said reach forming an opposite side of the processing chamber and said belt reach and wall converging upon each other progressing in the direction that the conveyor belt moves,
   a pair of opposed elongated flow barriers adjacent opposite side margins and extending longitudinally of said conveyor belt reach forming another set of sides of said processing chamber, said flow barriers being sealed along their lengths to said belt reach and wall,
   means including a filtering agency extending along the conveyor belt within said chamber dividing the chamber into at least two zones one comprising a longitudinally extending filtrate zone bounded on one side by a flow barrier, the other zone comprising a zone for holding material to be filtered which other zone is separated from the filtrate zone by the filtering agency, the zone for holding material to be filtered being spaced laterally of the filtrate zone, and
   conduit means connected to the filtrate zone for drawing off filtrate therein.

6. A continuous press for extracting liquid from a liquid-solid mixture comprising an imperforate conveyor belt with an elongated reach thereof forming one side of a processing chamber,
   an elongated imperforate wall opposite and spaced from said reach forming an opposite side of the processing chamber,
   opposed elongated flow barriers adjacent opposite side margins of said belt reach forming another set of sides of said processing chamber, said flow barriers including means sealing them to said belt reach and wall,
   elongated nontraveling ledge means extending longitudinally of said processing chamber and spaced inwardly from at least one flow barrier and defining on one side thereof and with the flow barrier a filtrate zone for the collection of filtrate,
   means including a filtering agency within said processing chamber cooperating with said ledge means to define on the opposite side of said ledge means a zone for holding material to be filtered, with the latter zone being separated from the filtrate zone by said filtering agency, and
   means connecting with said filtrate zone for withdrawing filtrate therein.

7. The press of claim 6, wherein the means within the processing chamber cooperating with said ledge means to define a zone for holding material to be filtered comprises a filter belt disposed about the outside of said imperforate belt, which travels through said pressure chamber on movement of said imperforate belt.

8. The press of claim 6, wherein said one flow barrier and said ledge means are joined together, the flow barrier is opposite the face of the imperforate belt, and the means sealing the flow barrier comprises means mounted on the flow barrier that engages the face of the imperforate belt.

9. A continuous press comprising a pair of imperforate conveyor belts having oppositely disposed elongated reaches that converge on each other and define a processing chamber with wide and narrow ends,
   means for moving the belts with said reaches advancing in the direction that they converge,
   filter belts extending along the outside of said imperforate belts, one on each, and movable with the belts in oppositely disposed relation through the processing chamber, an elongated partition extending longitudinally within the processing chamber snugly adjacent one set of edges of the filter belts operable to accommodate filtrate flow laterally of the filter belts but inhibiting the passage of solid material from between the filter belts, another such elongated partition snugly adjacent the opposite set of edges of the filter belts, opposed flow barriers adjacent opposite side margins of said belt reaches forming a set of sides for said processing chamber located laterally outwardly of said partitions, said flow barriers including means whereby they are sealed to opposite reaches of the belts, and said flow barriers adjacent the sides of the belt reaches defining a filtrate zone for collecting filtrate, and means connected to said filtrate zone for withdrawing filtrate therein.

10. The press of claim 9, wherein a partition and flow barrier on each side of the processing chamber are joined together as an elongated finger with said finger mounted in a stationary position between faces of the opposed imperforate belt reaches.

11. A continuous press comprising a pair of imperforate conveyor belts having oppositely disposed elongated reaches that converge on each other and define a processing chamber, means for moving the belts with said reaches advancing in the direction that they converge, filter belts extending along the outside of said imperforate belts, one on each, and movable with the belts in oppositely disposed relation through the processing chamber, an elongated partition extending longitudinally within the processing chambers snugly adjacent one set of edges of the filter belts operable to accommodate filtrate flow laterally of the filter belts but inhibiting the passage of solid material from between the filter belts, another such elongated partition snugly adjacent the opposite set of edges of the filter belts, and means for collecting filtrate which flows laterally of the filter belts.

References Cited

UNITED STATES PATENTS

| 1,778,342 | 10/1930 | Thompson | 100—118 X |
|-----------|---------|----------|-----------|
| 1,997,611 | 4/1935 | Thompson | 100—120 X |
| Re. 21,723 | 2/1941 | Thompson | 100—120 X |
| 2,308,031 | 1/1943 | Schmitz | 100—121 |
| 2,382,453 | 8/1945 | Thompson | 100—118 X |
| 2,682,832 | 7/1954 | Lohre et al. | 100—121 |
| 2,981,307 | 4/1961 | Malarkey | 100—154 |
| 3,104,608 | 9/1963 | Ribbans | 100—154 X |
| 3,215,065 | 11/1965 | Malarkey | 100—154 X |
| 3,269,303 | 8/1966 | Qviller | 100—121 |

FOREIGN PATENTS

| 28,844 | 6/1957 | Finland. |
|--------|--------|----------|
| 572,324 | 2/1924 | France. |

LOUIS O. MAASSEL, *Primary Examiner.*